– – – –
United States Patent [19]

Wambach

[11] 4,296,021

[45] Oct. 20, 1981

[54] REINFORCED THERMOPLASTIC POLYESTER COMPOSITIONS HAVING IMPROVED HIGH VOLTAGE BREAKDOWN RESISTANCE

[75] Inventor: Allen D. Wambach, Evansville, Ind.

[73] Assignee: General Electric Company, Pittsfield, Mass.

[21] Appl. No.: 747,634

[22] Filed: Dec. 6, 1976

[51] Int. Cl.[3] ............................ C08K 3/34; C08K 3/40
[52] U.S. Cl. .................................................. 260/40 R
[58] Field of Search ...................................... 260/40 R

[56]  References Cited

U.S. PATENT DOCUMENTS

| | | | |
|---|---|---|---|
| 3,479,318 | 11/1969 | Jackson | 260/40 R |
| 3,516,957 | 6/1970 | Groz et al. | 260/40 R X |
| 3,547,872 | 12/1970 | Weisserme | 260/40 R |
| 3,814,725 | 6/1974 | Zimmerman et al. | 260/40 R |
| 3,824,209 | 7/1974 | Anderson | 260/40 R X |
| 4,052,356 | 10/1977 | Breitenfellner et al. | 260/40 R |

FOREIGN PATENT DOCUMENTS

| | | | |
|---|---|---|---|
| 44-15191 | 7/1969 | Japan . | |
| 45-19789 | 7/1970 | Japan | 260/40 R |
| 46-39478 | 11/1971 | Japan | 260/40 R |

*Primary Examiner*—Lewis T. Jacobs
*Attorney, Agent, or Firm*—Morgan, Finnegan, Pine, Foley & Lee

[57]  ABSTRACT

Reinforced thermoplastic compositions are provided comprising a high molecular weight linear polyester, and a minor proportion of aluminum silicate alone or in combination with glass fiber reinforcement. The use of the aluminum silicate elevates strength, modulus and heat deflection temperature, while retaining the inherent resistance to high voltage breakdown of the polyester resin component.

12 Claims, No Drawings

REINFORCED THERMOPLASTIC POLYESTER COMPOSITIONS HAVING IMPROVED HIGH VOLTAGE BREAKDOWN RESISTANCE

This invention relates to reinforced thermoplastic polyester compositions having improved high voltage breakdown resistance. More particularly, it pertains to compositions comprising a linear high molecular weight polyester and a reinforcement comprising aluminum silicate alone, or combined with glass fibers. The reinforced compositions retain the resistance to high voltage breakdown of the polyester component, without impairing the strength, modulus and heat deflection temperature sought by adding a reinforcing filler.

BACKGROUND OF THE INVENTION

High molecular weight linear polyesters and copolyesters of glycols and terephthalic or isophthalic acid have been avilable for a number of years. These are described inter alia in Whinfield et al, U.S. Pat. Nos. 2,465,319 and in Pengilly, 3,047,539. These patents disclose that the polyesters are particularly advantageous as film and fiber-formers.

With the development of molecular weight control, use of nucleating agents and two-step molding cycles, poly(ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

A useful family of such compositions are those which are glass-reinforced, e.g., with from about 10 to about 40% of filamentous glass, based on the weight of glass and polyester component.

However, there is a need to improve high voltage dielectric breakdown resistance. For example, addition of 30% by weight of glass filaments to poly(1,4-butylene terephthalate) and molding the composition into rotors for automotive ignition system distributors, provides test pieces which show 50% failure in 100 hrs. when tested continuously at 30,000 volts. Since peak voltages in automobile distributors range from about 25,000 to 50,000 the breakdowns sometimes are noticed after only 35,000 to 50,000 miles of driving.

It has now been discovered that the use of aluminum silicate as a filler alone or in combination with glass fibers measurably improves the long term high voltage dielectric breakdown resistance of polyester resins. As an illustration, a poly(1,4-butylene terephthalate) composition containing 15% by weight of anhydrous, calcined, aluminum silicate and 20% by weight of glass fibers was found to have three times the expected life in comparison with 30% glass reinforced poly(1,4-butylene terephthalate). Tests conducted on molded rotors at 30,000 volts, continuously, showed that the aluminum silicate-containing composition had a 50% failure rate of 300 hours, whereas the 50% failure rate was only 100 hours with the aforementioned composition with 30% glass, but no aluminum silicate.

DESCRIPTION OF THE INVENTION

According to this invention, there are provided reinforced thermoplastic compositions, with enhanced toughness, for molding, e.g., injection molding, compression molding, transfer molding, and the like, comprising:

(a) a high molecular weight linear polyester resin; and (b) a reinforcing agent therefor comprising (i) aluminum silicate, preferably substantially anhydrous aluminum silicate, alone, or in combination with (ii) glass fibers, said reinforcing agent (b) being present in a minor proportion based on said composition, in an amount at least sufficient to reinforce the composition but in an amount not in excess of that which impairs the long term high voltage breakdown resistance of unfilled composition or one wherein the filler consists essentially of glass fibers.

When used herein, the expression, "long term voltage breakdown resistance" refers in general to dielectric strength and in practical terms to resistance to loss in insulation resistance against intermitant peak voltages in the range of 25,000 to 50,000 volts for a long time, of the order of three to six years. Another standard measure of resistance, for selection purposes, can comprise tests on molded pieces, such as dielectric strength tests as outlined in ASTM D149-64, and the like.

The high molecular weight normally flammable linear polyesters used in the present compositions are polymeric glycol esters of terephthalic acid and isophthalic acids. They are available commercially or can be prepared by known techniques such as by the alcoholysis of esters of the phthalic acid with a glycol and subsequent polymerization, by heating glycols with the free acids or with halide derivatives thereof, and similar processes. These are described in U.S. Pat. Nos. 2,465,319 and U.S. 3,047,539, and elsewhere.

Although the glycol portion of the polyester can contain from two to ten carbon atoms, it is preferred that it contain from two to four carbon atoms in the form of linear methylene chains.

Preferred polyesters will be of the family consisting of high molecular weight, polymeric glycol terephthalates or isophthalates having repeating units of the general formula:

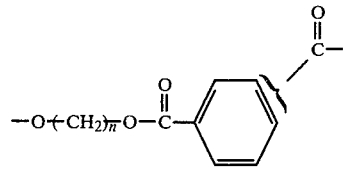

wherein n is a whole number of from two to four, and mixtures of such esters, including copolyesters of terephthalic and isophthalic acids of up to about 30 mole % isophthalic units.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, high molecular weight polyesters will have an intrinsic viscosity of at least about 0.4 deciliters gram and preferably, at least 0.7 deciliters/gram as measured in a 60:40 phenol/tetrachloroethane mixture at 30° C. At the higher intrinsic viscosities, there is a further enhancement in toughness of the present compositions.

The aluminum silicate used as reinforcement can be hydrated, in various degrees and preferably, it will be substantially anhydrous. More preferably, but not essentially, it will be calcined. It can also be pretreated with conventional chemicals to promote adhesion. The aluminum silicate can be made synthetically or it can be derived from clay, especially kaolin clay. Kaolin clay can be dispersed in water, classified and calcined to produce useful forms of aluminum silicate. Typically, it will have a hardness of 2.5 on the Moh scale. Both hydrated and anhydrous aluminum silicates useful in this invention are also commercially available, e.g., from the Freeport Kaolin Company, New York, New York 10017, under the trade name WHITETEX, and from Georgia Kaolin Company, Elizabeth, New Jersey, under the trade designation GK.

The reinforcing agent (b) may be employed at a range of up to about 60%, but preferably, for easy processability, it will range from 5 to 50% by weight. However, a particularly preferred range for aluminum silicate is 5% to 40% by weight. Within this particularly preferred range, it has been found advantageous to employ aluminum silicate in certain compositions between 5 and 25% by weight. If glass is included, preferred amounts will be from 1 to 40% by weight and especially preferably, from 15 to 40% by weight. All percentages are based on the combined weights of polyester component (a) and reinforcing agent (b).

The compositions of this invention can be prepared by a number of procedures. In one way, the reinforcing agent, e.g., aluminum silicate, and, optionally, glass fibers, is put into an extrusion compounder with the polyester resin to produce molding pellets. The reinforcing agent is dispersed in a matrix of the polyester resin in the process. In another procedure, the reinforcing agent (b) is mixed with the polyester resin by dry blending, then either fluxed on a mill and comminuted, or they are extruded and chopped. The reinforcing agent can also be mixed with the powdered or granular polyester and directly molded, e.g., by injection or transfer molding techniques.

It is always important to thoroughly free all of the ingredients; resin, reinforcement and any optional, conventional additives from as much water as possible.

In addition, compounding should be carried out to ensure that the residence time in the machine is short; the temperature is carefully controlled; the friction heat is utilized; and an intimate blend between the resin and the reinforcement is obtained.

Although it is not essential, best results are obtained if the ingredients are pre-compounded, pelletized and then molded. Pre-compounding can be carried out in conventional equipment. For example, after carefully pre-drying the polyester resin and the reinforcing agent, e.g., under vacuum at 100° C. for 12 hours, a single screw extruder is fed with a dry blend of the ingredients, the screw employed having a long transition section to ensure proper melting. On the other hand, a twin screw extrusion machine, e.g., a 28 mm Werner Pfleiderer machine can be fed with resin and additives at the feed port and reinforcement down stream. In either case, a generally suitable machine temperature will be about 450° to 460° F.

The pre-compounded composition can be extruded and cut up into molding compounds such as conventional granules, pellets, etc. by standard techniques.

The compositions can be molded in any equipment conventionally used for glass-filled thermoplastic compositions. For example, with poly(1,4-butylene terephthalate), good results will be obtained in an injection molding machine, e.g., of the Newbury type with conventional cylinder temperatures, e.g., 450° F. and conventional mold temperatures, e.g., 150° F. On the other hand, with poly(ethylene terephthalate), because of the lack of uniformity of crystallization from interior to exterior of thick pieces, somewhat less conventional but still well-known techniques can be used. For example, a nucleating agent such as graphite or a metal oxide, e.g., ZnO or MgO can be included and standard mold temperature of at least 230° F. will be used.

DESCRIPTION OF THE PREFERRED EMBODIMENTS

The following examples illustrate the invention. They are set forth as a further description but are not to be construed as limiting the invention thereto.

EXAMPLE 1

Dry blends of poly(1,4-butylene terephthalate), intrinsic viscosity, 0.80 dl./g., melt viscosity about 1800 poises, anhydrous aluminum silicate (calcined clay), Freeport Kaolin Company, WHITETEX, and 1/8 inch fibrous glass reinforcement are compounded and extruded at 520° F. in an extruder. For comparison purposes, blends of the polyester and 1/8 inch fibrous glass reinforcement are compounded and extruded. The extrudate is pelletized and injection molded in a Newbury machine at 480° F. (mold temperature, 130° F.). The compositions are also molded into rotors for automotive ignition systems, to serve as test pieces. The formulations used and the physical and electrical properties obtained are summarized in Table 1:

Table 1.

| Physical properties of compositions of poly(1,4-butylene terephthalate) and aluminum silicate | | |
|---|---|---|
| Example | 1 | 1A* |
| Ingredients (parts by weight) | | |
| poly(1,4-butylene terephthalate) | 65 | 70 |
| aluminum silicate | 15 | — |
| fibrous glass reinforcement 1/8" | 20 | 30 |
| Properties | | |
| Notched Izod impact, ft.lbs./in | 0.67 | 1.7 |
| Tensile strength, psi | 12,580 | 17,300 |
| Flexural modulus, psi | 950,000 | 1,000,000 |
| Heat Deflection Temp., °F. 264 psi | 380 | 400 |
| T50% failure at 30,000 volts, hrs.** | 300 | 100 |

*Control, typical values
**Molded into distributor rotors and tested for breakdown; time for 50% of the rotors to fail.

The above results demonstrate that aluminum silicate is a uniquely superior reinforcement for dielectric strength retention purposes when compared to glass fibers alone. Moreover, the polybutylene terephthalate reinforced with aluminum silicate, still retains a surprising degree of toughness. On the other hand, the material reinforced with glass alone is less than totally satisfactory in its resistance to dielectric breakdown.

EXAMPLE 2

The procedure of Example 1 is repeated, substituting a poly(1,4-butylene terephthalate) having an I.V. of 0.9 dl./g. The formulations used and the physical and electrical properties are summarized in Table 2:

Table 2.

| Properties of compositions of poly(1,4-butylene terephthalate) and aluminum silicate | | |
|---|---|---|
| Example | 2 | 2A* |
| Ingredients (parts by weight) | | |
| poly(1,4-butylene terephthalate) | 65 | 70 |
| aluminum silicate | 15 | — |
| fibrous glass reinforcement ⅛" | 20 | 30 |
| Properties | | |
| Heat Deflection Temp., °F. | | |
| 66 psi | 426 | 432 |
| 264 psi | 394 | 408 |
| Notched Izod impact, ft.lbs./in. | 0.9 | 2.3 |
| Flexural strength, psi | 22,200 | 28,600 |
| Flexural modulus, psi | 859,000 | 1,010,000 |
| Tensile strength, psi | 14,200 | 18,300 |
| Gardner impact, in.lbs. | 8 | 16 |
| Dielectric strength ASTM D149 | | |
| 300° F. volts/mil** | 480 | 444 |

*Control
**Specimen is ⅛" × 4" disc.

EXAMPLE 3

The procedure of Example 2 is repeated, omitting the glass entirely from the reinforced compositions. The formulations, physical and electrical properties data are summarized in Table 3:

Table 3.

| Physical properties of compositions of poly(1,4-butylene terephthalate) and aluminum silicate | | |
|---|---|---|
| Example | 3 | 3A* |
| Ingredients (parts by weight) | | |
| poly(1,4-butylene terephthalate) | 70 | 100 |
| aluminum silicate | 30 | — |
| Properties | | |
| Gardner impact, in.lbs. | 16 | 375 |
| Notched Izod impact, ft.lbs./in. | 0.5 | 0.9 |
| Tensile strength, psi | 9,400 | 7,500 |
| Flexural modulus, psi | 637,000 | 344,000 |
| Flexural strength, psi | 16,700 | 12,700 |
| Heat Deflection Temp., °F. | | |
| 66 psi | 388 | 296 |
| 264 psi | 218 | 129 |
| Dielectric strength ASTM D149 | | |
| 300° F. volts/mil** | 445 | 326 |

*Control
**Specimen is ⅛" × 4" disc.

It is seen that aluminum silicate increases the resistance to electrical breakdown.

Obviously, other modifications are possible in view of the above examples. For instance, if the procedure of Example 1 is repeated, substituting for the poly(1,4-butylene terephthalate) the following high molecular weight linear polyesters:

a poly(ethylene terephthalate) having an intrinsic viscosity of about 0.9;

a 60/40 ethylene terephthalate-ethylene isophthalate copolyester having an intrinsic viscosity of about 0.9; or a poly(1,3-propylene terephthalate) prepared from trimethylene glycol and methyl terephthalate and having an intrinsic viscosity of about 1.0, reinforced polyester compositions according to this invention will be obtained. Hydrated aluminum silicate can also be substituted for anhydrous aluminum silicate.

Because of their excellent physical, mechanical, chemical, electrical and thermal properties, the resin-aluminum silicate composites of this invention have many and varied uses. The molding powder formulations may be used alone or mixed with other polymers, as well as flame retardants, non-dripping agents, pigments and dyes, stabilizers, plasticizers, and the like.

Obviously, other modifications and variations of the present invention are possible in the light of the above teachings. It is, therefore, to be understood that changes may be made in the particular embodiments of the invention described which are within the full intended scope of the invention as defined by the appended claims.

I claim:

1. A method of improving the high voltage dielectric breakdown characteristics of reinforced thermoplastic compositions comprising adding to a polybutylene therephthalate resin a reinforcing agent comprising (i) aluminum silicate, alone, or in combination with (ii) glass fibers, said reinforcing agent being present in an amount of up to 60% by weight of said reinforced thermoplastic composition and in an amount at least sufficient to reinforce the composition but in an amount not in excess of that which impairs the long term high voltage breakdown resistance of the composition in comparison with a corresponding unfilled composition or one wherein the filler consists essentially of glass fibers.

2. A method of improving the high voltage dielectric breakdown characteristics of a reinforced thermoplastic composition according to claim 1 wherein the reinforcing agent comprises aluminum silicate in an amount comprising from about 5 to up to about 50% by weight of the combined weight of the reinforced composition.

3. A method of improving the high voltage dielectric breakdown characteristics of a reinforced thermoplastic composition according to claim 1 wherein the reinforcing agent comprises aluminum silicate in an amount comprising from about 5 to about 40% by weight, and glass fibers in an amount comprising from about 1 to about 40% by weight, based on the combined weight of the reinforced composition.

4. A method of improving the high voltage dielectric breakdown characteristics of a reinforced thermoplastic composition according to claim 2 wherein the aluminum silicate comprises from about 5 to about 25% by weight of the combined weight of the reinforced composition.

5. A method of improving the high voltage dielectric breakdown characteristics of a reinforced thermoplastic composition according to claim 3 wherein the aluminum silicate comprises from about 5 to about 25% by weight, and the glass fibers comprise from about 15 to about 40% by weight of the combined weight of the reinforced composition.

6. A method of improving the high voltage dielectric breakdown characteristics of a reinforced thermoplastic composition according to claim 1 wherein said aluminum silicate is anhydrous aluminum silicate.

7. A method of improving the high voltage dielectric breakdown characteristics of a reinforced thermoplastic composition according to claim 1 wherein said polyester has an intrinsic viscosity of at least about 0.8 deciliters per gram when measured in a solution in 60:40 mixture of phenol and trichloroethane at 30° C.

8. A method of improving the high voltage dielectric breakdown characteristics of a reinforced thermoplastic composition according to claim 1 wherein said polyester is selected from the group consisting of polymeric glycol terephthalate and isophthalate esters having repeating units of the formula:

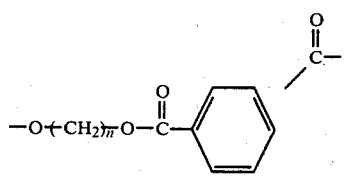

wherein n is a whole number of from two to four, and mixtures of such esters.

9. A method of improving the high voltage dielectric breakdown characteristics of a reinforced thermoplastic composition according to claim 8 wherein said polyester is poly(1,4-butylene terephthalate).

10. A method of improving the arc resistance and tracking resistance characteristics of a moulding compound according to claim 9 wherein the amount of reinforcing filler which is added is from about 10 to about 40 percent by weight, referred to the total composition.

11. A method of improving the arc resistance and tracking resistance characteristics of a moulding compound according to claim 9 wherein the reinforcing filler is glass fibers.

12. A method of improving the arc resistance and tracking resistance characteristics of a moulding compound according to claim 9 wherein the amount of kaolin which is added is from about 10 to about 40 percent by weight, referred to the total composition.

* * * * *

UNITED STATES PATENT AND TRADEMARK OFFICE
CERTIFICATE OF CORRECTION

PATENT NO. : 4,296,021

DATED : October 20, 1981

INVENTOR(S) : Allen D. Wambach

It is certified that error appears in the above-identified patent and that said Letters Patent is hereby corrected as shown below:

On the title page "12 Claims" should read -- 11 Claims --.

Column 6, lines 65-68 should be cancelled.

Column 7, lines 1-15 should be cancelled.

Column 7, line 16, "9" should read -- 8 --.

Column 8, line 1, "8" should read -- 1 --.

Signed and Sealed this

Fifth Day of November 1985

[SEAL]

Attest:

*Attesting Officer*

DONALD J. QUIGG

*Commissioner of Patents and Trademarks*